United States Patent [19]

Komanduri et al.

[11] Patent Number: 4,552,492
[45] Date of Patent: Nov. 12, 1985

[54] CUTTING INSERT WITH MEANS FOR SIMULTANEOUSLY REMOVING A PLURALITY OF CHIPS

[75] Inventors: Ranga Komanduri; William R. Reed, Jr., both of Schenectady, N.Y.

[73] Assignee: General Electric Company, Schenectady, N.Y.

[21] Appl. No.: 467,694

[22] Filed: Feb. 18, 1983

[51] Int. Cl.⁴ .............................................. B23B 27/22
[52] U.S. Cl. .................................... 407/114; 407/65; 407/70
[58] Field of Search .................. 407/64, 65, 114, 115, 407/116, 67, 68, 70, 71; 82/1 C, 13, 11

[56] References Cited

U.S. PATENT DOCUMENTS

| Re. 28,416 | 5/1975 | Hougen | 408/204 |
|---|---|---|---|
| 686,134 | 11/1901 | Rogers | 407/64 |
| 2,049,685 | 8/1936 | Brown | 407/70 |
| 2,688,791 | 9/1954 | Luers et al. | 407/115 |
| 2,900,704 | 8/1959 | Sweet | 407/68 |
| 3,078,547 | 2/1963 | Sweet | 407/68 |
| 3,187,611 | 6/1965 | Sweet | 407/68 |
| 3,436,800 | 4/1969 | Cashman et al. | 407/70 |
| 3,466,721 | 9/1969 | Binns | 407/70 |
| 4,140,431 | 2/1979 | Friedline | 407/114 |
| 4,248,553 | 2/1981 | Kraemer | 407/114 |

FOREIGN PATENT DOCUMENTS

| 453004 | 11/1948 | Canada | 407/116 |
|---|---|---|---|
| 2213786 | 9/1973 | Fed. Rep. of Germany | 407/114 |
| 2802395 | 7/1978 | Fed. Rep. of Germany | 407/69 |
| 511480 | 12/1920 | France | 82/13 |
| 470460 | 4/1959 | Italy | 407/65 |
| 673378 | 7/1979 | U.S.S.R. | 82/1 C |

Primary Examiner—Leonidas Vlachos
Assistant Examiner—Jerry Kearns
Attorney, Agent, or Firm—Leo I. MaLossi; James C. Davis, Jr.; James Magee, Jr.

[57] ABSTRACT

A cutting insert presents clearance and rake faces constructed and dimensionally interrelated to provide a plurality of adjacent offset, substantially parallel, non-coplanar cutting edges. The offset is in the range of from about 0.010 to 0.100 inch and the planes along the clearance face, which include the cutting edges, form part of a series of steps defined by intersecting planes. Each of the angles between these intersecting planes has a value of at least about 90 degrees.

7 Claims, 7 Drawing Figures

CUTTING INSERT WITH MEANS FOR SIMULTANEOUSLY REMOVING A PLURALITY OF CHIPS

BACKGROUND OF THE INVENTION

In the machining of metallic articles, inadequate chip disposal and machine chatter are two important factors that can limit productivity. The limitation on productivity becomes more serious when the machining is conducted at higher cutting speeds, higher removal rates and, when machining those materials that yield a segmental or shear-localized type of chip.

Short chips are always preferred over long, stringy chips, not only from the point of view of chip disposal, but also from the point of view of human safety and potential damage to the part being machined. One solution to the problem of chip disposal is the use of cutting inserts constructed with appropriate chip-groove geometry. Another way to handle the problem is by selecting the proper tool geometry, especially in respect to the back rake angle.

This invention presents still a further solution to the problem of chip disposal and, at the same time reduces chatter. The problem of chatter addressed by this invention is particularly evident in the machining of difficult-to-machine materials, such as the machining of titanium alloys. Other materials, such as nickel base superalloys (e.g. Inconel 718) and hardened alloy steels (e.g. AISI 4340), also present this problem depending upon the cutting speed and the feed. When such chatter is encountered, the frequency of oscillation varies proportionately with the cutting speed and inversely with the feed. The feed approximates the thickness of the uncut chip. Application of this invention provides a more uniform cutting force and a reduction in the amplitude of chatter.

The tool insert design of this invention is particularly applicable to such tool materials as cemented carbides such as straight WC and multi-carbides in a cobalt binder, TiC in a Ni-Mo binder and coated carbides and ceramic materials such as alumina, mixtures of alumina with TiO, $ZrO_2$ and/or TiC, and mixtures of silicon nitride with TiC, $Al_2O_3$, $Y_2O_3$.

Certain definitions are useful for a better understanding of this invention:

Segmental chip - a continuous chip with a periodic, but asymmetric variation in chip thickness.

Shear-localized chip - a continuous serrated chip in which during the upsetting stage intense shear occurs between the chip segment being formed and the chip segment immediately preceding.

Chatter of the forced type - a vibration of the metal cutting machine induced by the cutting operation, when chips of either the segmental or shear-localized types are being produced.

More detailed description of the formation of segmental and shear-localized chips is set forth on page 122 of the article by Komanduri, et al., "On The Catastrophic Shear Instability in High-Speed Machining of An AISI 4340 Steel" [Journal of Engineering for Industry, May 1982, Vol. 104, pp. 121-131].

DESCRIPTION OF THE INVENTION

A cutting insert for metal removal, which facilitates chip disposal and reduces machine chatter is the subject of this invention. Instead of removing a single chip approximating in dimension the depth of cut, the cutting insert of this invention is provided with means for simultaneously removing from the workpiece for the same depth of cut a plurality of chips in side-by-side array. In its simplest form, the cutting insert construction comprises a body provided with multiple steps formed on its clearance face (also referred to as "flank face"), which results in a plurality of adjacent offset substantially parallel cutting edges the sum of the lengths of which approximately equals the depth of cut, which normally would be removed as a single chip. In addition, and particularly for those instances in which these multiple cutting edges are of short length, steps are also formed in the rake face in order to retain the separation of the single chip initiated at the cutting edges. In its method aspect, this invention comprises the steps of bringing a cutting insert of the type described above into contact with a metal workpiece under conditions such that the cutting speed is in excess of the speed at which chatter of the forced type would be expected to occur and moving the cutting insert relative to the workpiece so as to simultaneously remove a plurality of chips from the workpiece in side-by-side array.

BRIEF DESCRIPTION OF THE DRAWINGS

The features of this invention believed to be novel and unobvious over the prior art are set forth with particularity in the appended claims. The invention itself, however, as to the organization, method of operation and objects and advantages thereof, may best be understood by reference to the following description taken in conjunction with the following drawings wherein:

MANNER AND PROCESS OF MAKING AND USING THE INVENTION

In the following description of cutting inserts of this invention like or similar structure in the several views is identified in the same mamner. Thus, each of the cutting inserts 10, 20, 30, 40 is defined by spaced opposed primary faces interconnected by peripheral surface area, which may consist of planar surfaces in conjunction with one (or more) stepped regions or curved surface area(s) in conjunction with one (or more) stepped regions. In each case the stepped region is intended to be used during the cutting operation with this region comprising the clearance surface region of the cutting insert. As is customary, the cutting edge portion of the tool is formed by the intersection of the clearance surface region with a primary face (i.e. the rake face).

Figure 1:
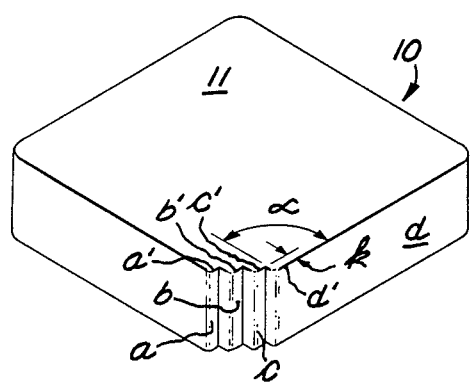
FIGS. 1–4 are three-dimensional views of various embodiments of this invention.

FIG. 1 illustrates one of the simpler embodiments of the cutting insert of this invention. Surface 11 and the surface opposite thereto (not shown) comprise the opposed primary faces of this insert and the peripheral surface area interconnecting these faces consists of the series of planar surfaces (two of which are not shown) which, together with the primary faces, define body 10. One corner of insert 10 has a multistep configuration defined by a series, or set, of intersecting planar surfaces of which surfaces a, b, c (together with d) comprise the clearance face(s) of insert 10. The linear segments a', b', c' and d' provide the cutting edges employed for metal removal. These cutting edges are substantially parallel to each other and offset from each other. The letter k designates the offset between cutting edge c' and cutting edge d'. Typically, the offset in each instance between adjacent cutting edges is the same. Intersecting planar surfaces are provided with a small nose radius at the intersection as is customary practice.

Figure 3:
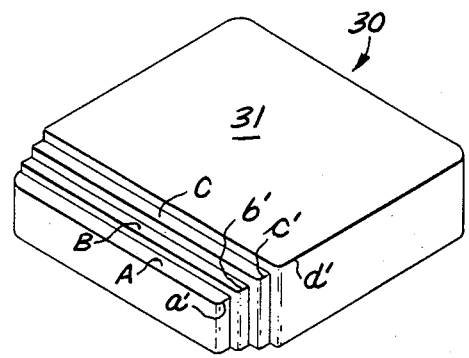
Figure 2:
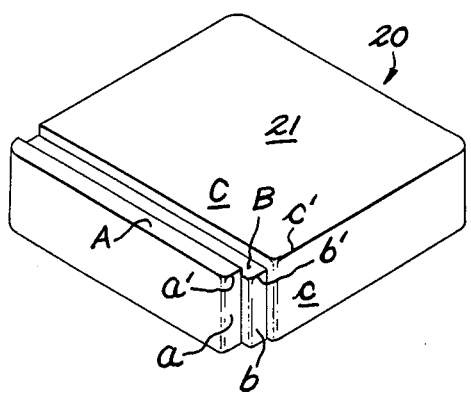

The embodiments of FIGS. 2 and 3 (i.e. inserts 20 and 30) differ from insert 10 in that each is provided with a multi-step configuration on the rake face (primary faces 21, 31, respectively). Each one of this second set of steps intersects one of the first (clearance face) steps, matching the width thereof, to provide a plurality of offset, usually non-coplanar substantially, parallel cutting edges as shown. The rake surfaces A, B, C (and in the case of FIG. 3, D), because of the difference in elevation between adjacent rake surfaces promote chip separation initiated by cutting edges a', b', etc. in side-by-side array as will be described in connection with FIG. 5 hereinbelow. This feature is of particular importance, if the offset between adjacent cutting edges (e.g. dimension k) is small (e.g. less than about 0.010 inch).

Figure 4:
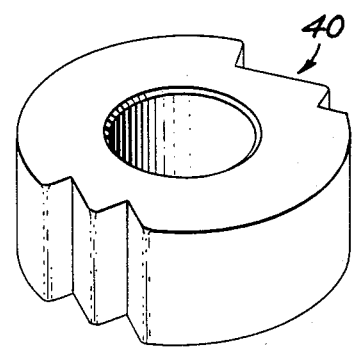

Insert configuration 40 shown in FIG. 4 provides solutions to the same problems (improved chip disposal and reduced amplitude of chatter) and, in addition thereto, the advantage of providing a reduction in notching of the tool insert at the depth-of-cut line. This is particularly important when ceramic tool materials are employed in the machining of difficult-to-machine materials such as nickel-base superalloys and hardened steels. The limitation of tool insert life in such case may be determined by the extent of depth-of-cut line notching rather than by flank and/or crater wear. The tendency to notch is found to decrease with increase in side cutting edge angle (SCEA). Thus, tool inserts, such as insert 40, made in a predominantly circular configuration as shown, provide large values of SCEA (approximately 70°) and are found to notch significantly less than square or triangular tools having 0° SCEA. In the case of the round or circular configured tool insert, the curvature of the tool beyond the depth-of-cut line helps to reduce this tendency to notch.

Figure 5:
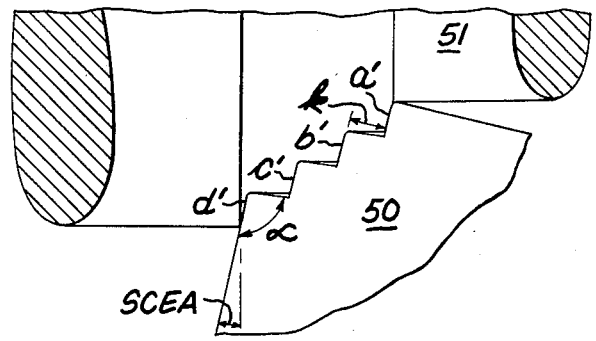
FIG. 5 is a schematic view in plan of the cutting insert of FIG. 1 positioned in machining mode against a workpiece.

In FIG. 5, cutting insert 50 of the type shown in FIG. 1 is shown in cutting position against workpiece 51. Insert 50 is being used in this machining operation with the SCEA shown (angle $\alpha$ has a value of about 90° plus the value of the SCEA). Although the use of the insert construction of this invention is illustrated in a turning operation in FIG. 5, successful tests have also been conducted in milling operations.

Because of the stepped construction of the clearance face of insert 50, instead of removing one single chip approximating in dimension the depth of cut, a plurality of narrower chips are simultaneously removed in an array (i.e. four chips) by the cutting edges a', b', c', d'. If insert 50 were used with a shallower depth of cut such that cutting edges a' and b' were operative, two narrow chips would be simultaneously removed in the array. In order to ensure that separate narrow chips are formed, offset k should have a value in the range of 0.010–0.100 inch. The preferred range for this dimension will depend upon the size of the insert, for example, for a $\frac{1}{2}''\times\frac{1}{2}''$ insert, the preferred range is 0.010 to 0.050 inch. Workpiece material and cutting conditions will affect the selection of a particular k value.

If a small value for offset k is to be used and if the length of each cutting edge to be used in making the cut is relatively small, it may be necessary to employ one of the insert constructions shown in FIGS. 2 and 3 in order that rake face grooves will be available to promote separation of the chips presented in the array. The total width of the array is approximately equal to the depth of cut; if the SCEA is 0°, the width of chip array is substantially equal to the depth of cut.

Chatter of the forced type is found to occur at all cutting speeds (a) when machining titanium alloys; (b) when machining Inconel 718 above about 200 surface feed per minute (SFPM), and (c) when machining AISI 4340 steel having a Brinell hardness number (BHN) of 225 above about 800 SFPM. The frequency of oscillation under these conditions varies proportionately with the cutting speed and inversely with the feed. The cutting forces oscillate in an asymmetric cyclic manner. When multiple chips (i.e., a chip array) are cut using the stepped insert of this invention, a slight difference in the frequency of oscillation is experienced by each step of the insert being used during the cutting due to the differences in the cutting speed at each step. Further, it is believed that in the design of specific cutting inserts according to this invention, a phase difference can be provided between the components of force (cutting and thrust) for each step of the insert. The net effect can be a more uniform cutting force and a reduction in the amplitude of chatter.

Table I (an exerpt from page 125 of the above-noted Komanduri, et al. article) provides an indication of the relationship between hardness of the metal being machined and the cutting speed at which chatter of the forced type develops.

TABLE I

| Hardness of AISI 4340 steel work material (BHN) | Cutting speed at which catastrophic shear completely developed (SFPM) | Cutting speed at which individual segments were completely isolated (SFPM) |
| --- | --- | --- |
| 520 | 200 | 1000 |
| 325 | 800 | 3200 |
| 215 | 1600 | 6400 |

Cutting inserts in the several embodiments shown in FIGS. 1–4 made of various tool materials have been successfully employed in machining operations. These tests included as the tool materials cemented tungsten carbide and various ceramics. In tests, which employed Carboloy ® tungsten carbide grade 883 as the material for both the conventional insert and the insert of this invention, the chips shown in FIG. 6 (titanium 6 Al-4 V workpiece) and FIG. 7 (Inconel 718 workpiece) were obtained. The machining tests were conducted on a Lodge and Shipley lathe under the following cutting conditions using the configuration of FIG. 2:

| | |
| --- | --- |
| Cutting Speed | 300 SFPM |
| Depth of Cut | 0.150 inch |
| Feed | 0.010 inch/revolution |
| Back rake angle | −5° |

| | |
|---|---|
| Side rake angle | −5° |
| Clearance angle | +5° |
| SCEA | 15° |

Figure 6:
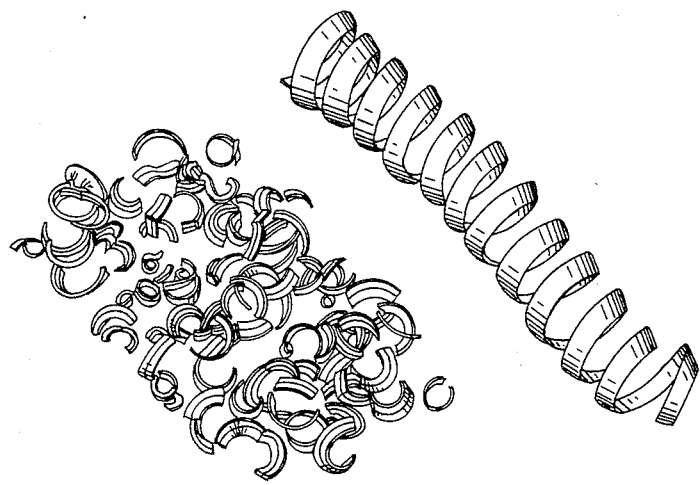
FIG. 6 is a photographic display showing the long, stringy chip obtained using a conventional tool insert to machine a titanium alloy and at the left thereof short narrow chips obtained machining the same workpiece under the same operating conditions (e.g. same depth of cut) with a cutting insert according to this invention.
Figure 7:
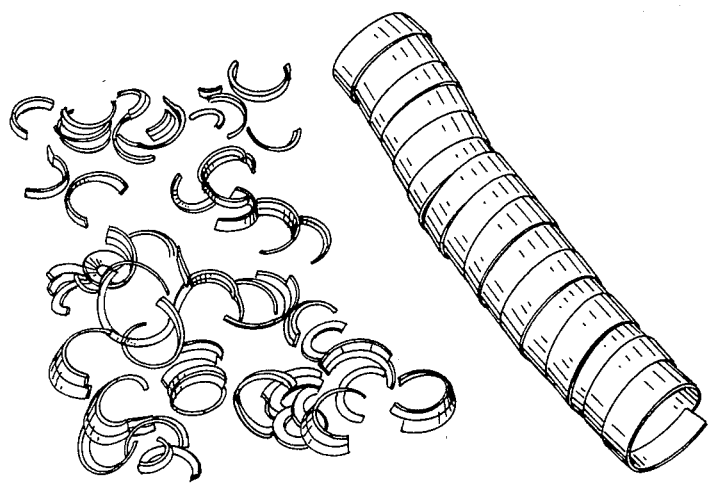
FIG. 7 is a photographic display similar to that of FIG. 6 in which the workpiece was Inconel 718.

Each of FIGS. 6 and 7 shows on the righthand side of the photograph the long stringy chip obtained using the conventional tool and on the lefthand side of the photograph a number of the short narrower chips obtained. The same results were obtained using the other configurations in the drawings. Based on the level of audible noise, the chatter produced was less when the short chips were being produced than when the long stringy chips were being generated.

When an AISI 4340 steel workpiece was used with the above-noted cutting conditions, the cutting speed was not high enough to form a shear localized type of chip; an array of side-by-side chips was obtained, but they did not break up as short chips. Subsequent tests using the same workpiece conducted at speeds from 200 to 1,000 SFPM yielded shorter narrow chips similar to those shown in FIGS. 6 and 7, when the cutting speed was greater than 800 SFPM.

What we claim as new and desire to secure by Letters Patent of the United States is:

1. A polygonal cutting insert comprising first and second spaced substantially parallel opposed primary faces, a plurality of side faces generally perpendicular to said primary faces connecting said primary faces, at least one corner formed by the intersection of said first primary face and two of said side faces, at least three discrete substantially parallel cutting edges at said corner formed adjacent the intersection of said two side faces and said first primary face, at least two of said cutting edges being staggered inwardly to a different extent in a direction parallel with said first primary face and at least one of said cutting edges being staggered inwardly in a direction perpendicular to said first primary face.

2. The polygonal cutting insert as recited in claim 1 wherein each of the cutting edges is located at the intersection of a different pair of first and second planes, said first planes being substantially mutually parallel and extending in a direction perpendicular to the first primary face and said second planes being substantially mutually parallel and extending in the same direction as said first primary face.

3. The cutting insert of claim 2 wherein there are three second planes, the center second plane being recessed between the second planes on either side thereof.

4. The cutting insert of claim 2 wherein the first and second planes of each pair of first and second planes intersect at an angle of about 90 degrees.

5. The cutting insert of claim 1 wherein the parallel cutting edges are substantially equal in length.

6. The cutting insert of claim 1 wherein the extent of stagger inwardly in a direction parallel with the first primary face is in the range of from about 0.010 to about 0.100 inch.

7. The cutting insert of claim 6 wherein the extent of stagger is in the range of from about 0.010 to 0.050 inch.

* * * * *